US011323475B2

(12) United States Patent
Xie

(10) Patent No.: US 11,323,475 B2
(45) Date of Patent: May 3, 2022

(54) SYSTEM AND METHOD FOR DETECTING REPLAY ATTACK

(71) Applicant: ADVANCED NEW TECHNOLOGIES CO., LTD., Grand Cayman (KY)

(72) Inventor: Guilu Xie, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 532 days.

(21) Appl. No.: 16/464,172

(22) PCT Filed: Dec. 29, 2018

(86) PCT No.: PCT/CN2018/125782
§ 371 (c)(1),
(2) Date: May 24, 2019

(87) PCT Pub. No.: WO2019/072314
PCT Pub. Date: Apr. 18, 2019

(65) Prior Publication Data
US 2020/0296130 A1 Sep. 17, 2020

(51) Int. Cl.
*H04L 29/06* (2006.01)
*G06F 16/23* (2019.01)
(52) U.S. Cl.
CPC ...... *H04L 63/1466* (2013.01); *G06F 16/2365* (2019.01)

(58) Field of Classification Search
CPC ............. H04L 63/1466; H04L 63/1416; G06F 16/2365
See application file for complete search history.

(56) References Cited

U.S. PATENT DOCUMENTS

| 8,392,709 | B1 | 3/2013 | Agrawal |
| 8,959,346 | B2 | 2/2015 | Agrawal |
| 9,853,949 | B1 | 12/2017 | Stickle et al. |
| 10,299,113 | B1 | 5/2019 | Viswanathan et al. |
| 10,607,030 | B2 | 3/2020 | Rodriguez De |
| 10,608,829 | B1 | 3/2020 | Yoshihama et al. |

(Continued)

FOREIGN PATENT DOCUMENTS

| CA | 3043536 A1 | 11/2018 |
| CN | 106295401 A | 1/2017 |

(Continued)

OTHER PUBLICATIONS

Office Action for Japanese Application No. 2019-528022 dated Sep. 29, 2020.

(Continued)

*Primary Examiner* — Mahfuzur Rahman

(57) ABSTRACT

A computer-implemented method for detecting replay attack comprises: obtaining at least one candidate transaction for adding to a blockchain; verifying if an identification of the candidate transaction exists in an identification database, the identification database comprising a plurality of identifications within a validation range; and in response to determining that the identification does not exist in the identification database, determining that the candidate transaction is not associated with a replay attack.

20 Claims, 8 Drawing Sheets

(56) References Cited

U.S. PATENT DOCUMENTS

| | | | |
|---|---|---|---|
| 10,681,175 | B2 | 6/2020 | Li |
| 2014/0258110 | A1 | 9/2014 | Davis et al. |
| 2015/0324789 | A1 | 11/2015 | Dvorak et al. |
| 2016/0191243 | A1 | 6/2016 | Manning |
| 2016/0283939 | A1 | 9/2016 | Finlow-Bates |
| 2017/0149819 | A1 | 5/2017 | Androulaki et al. |
| 2017/0206382 | A1 | 7/2017 | Rodriguez De et al. |
| 2017/0232300 | A1* | 8/2017 | Tran .................. H04L 67/10 434/247 |
| 2018/0039667 | A1 | 2/2018 | Pierce et al. |
| 2018/0078843 | A1* | 3/2018 | Tran ................ G09B 19/0038 |
| 2018/0089683 | A1 | 3/2018 | Setty et al. |
| 2018/0144114 | A1* | 5/2018 | Fiske .................... G06F 21/32 |
| 2018/0204195 | A1 | 7/2018 | Kang |
| 2018/0308094 | A1 | 10/2018 | Jayaram et al. |
| 2018/0322489 | A1 | 11/2018 | Altenhofen |
| 2019/0035014 | A1 | 1/2019 | Bell et al. |
| 2019/0043010 | A1 | 2/2019 | Smith et al. |
| 2019/0051390 | A1 | 2/2019 | Shah |
| 2019/0124146 | A1 | 4/2019 | Austin et al. |
| 2019/0182055 | A1 | 6/2019 | Christidis et al. |
| 2019/0190697 | A1 | 6/2019 | Cunico et al. |
| 2019/0197532 | A1 | 6/2019 | Jayachandran et al. |
| 2019/0205884 | A1 | 7/2019 | Batra et al. |
| 2019/0260574 | A1 | 8/2019 | Shi et al. |
| 2019/0280871 | A1 | 9/2019 | Subramanian |
| 2019/0303463 | A1 | 10/2019 | Catalano et al. |
| 2019/0314726 | A1* | 10/2019 | Masini ................ G07F 17/326 |
| 2019/0318338 | A1 | 10/2019 | Verma et al. |
| 2019/0379543 | A1* | 12/2019 | Sethi .................. H04L 9/3236 |
| 2019/0391973 | A1 | 12/2019 | Qiu |
| 2020/0007346 | A1 | 1/2020 | Callan et al. |
| 2020/0019936 | A1 | 1/2020 | Irazabal |
| 2020/0036707 | A1* | 1/2020 | Callahan .............. H04L 9/3231 |
| 2020/0043115 | A1 | 2/2020 | Nelson et al. |
| 2020/0076625 | A1 | 3/2020 | Kass |
| 2020/0090143 | A1 | 3/2020 | Iervolino |
| 2020/0112445 | A1 | 4/2020 | Yoshihama et al. |
| 2020/0128043 | A1 | 4/2020 | Xie |
| 2020/0128044 | A1 | 4/2020 | Xie |
| 2020/0296130 | A1 | 9/2020 | Xie |
| 2020/0358614 | A1* | 11/2020 | Fiske .................. H04L 9/3228 |
| 2020/0366479 | A1 | 11/2020 | Lee et al. |

FOREIGN PATENT DOCUMENTS

| | | |
|---|---|---|
| CN | 106991607 A | 7/2017 |
| CN | 108494775 A | 9/2018 |
| CN | 108764870 A | 11/2018 |
| CN | 108805569 A | 11/2018 |
| CN | 108881120 A | 11/2018 |
| CN | 108989043 A | 12/2018 |
| CN | 109064171 A | 12/2018 |
| JP | 2018-533320 A | 11/2018 |
| WO | 2011036066 A1 | 3/2011 |
| WO | 2016154140 A1 | 9/2016 |
| WO | 2017/180382 A1 | 10/2017 |
| WO | 2018032377 A1 | 2/2018 |
| WO | 2018153485 A1 | 8/2018 |
| WO | 2018/205971 A1 | 11/2018 |
| WO | 2018204456 A1 | 11/2018 |
| WO | 2019003081 A1 | 1/2019 |
| WO | 2019121656 A1 | 6/2019 |

OTHER PUBLICATIONS

Office Action for Japanese Application No. 2019-528089 dated Sep. 29, 2020.

Cecchetti, Ethan et al., Solidus: Confidential Distributed Ledger Transactions via PVORM, Cryptology ePrint Archive [online], International Association for Cryptologic Research, Oct. 30, 2017, Report 2017/317, Ver. 20170831:160538, pp. 1-23, [search date: Sep. 8, 2020], Internet, <URL: https://eprint.iacr.org/2017/317/20170831:160538>.

Notice of Allowance for U.S. Appl. No. 16/716,970 dated Apr. 16, 2020.

Written Opinion of the International Searching Authority and International Search Report for PCT Application No. PCT/CN2018/125782 dated Sep. 26, 2019 (6 pages).

Written Opinion of the International Searching Authority and International Search Report for PCT Application No. PCT/CN2018/125729 dated Sep. 26, 2019 (6 pages).

First Examination Report for Indian Application No. 201947020635 dated Jan. 28, 2021.

Non-Final Office Action for U.S. Appl. No. 16/464,013 dated May 7, 2021.

Office Action for Korean Application No. 10-2019-7015101 dated Sep. 23, 2020.

Lun Li et al., "CreditCoin: A Privacy-Preserving Blockchain-Based Incentive Announcement Network for Communication of Smart Vehicles", IEEE, Jul. 2018.

Notice of Allowance for U.S. Appl. No. 16/464,013 dated Sep. 8, 2021.

Communication pursuant to Article 94(3) EPC for European Application No. 18867009.5 dated Sep. 27, 2021.

Steiner J G et al., "Kerberos: An Authentication Service for Open Network Systems," Proceedings of the Winter USENIX Conference, Feb. 9, 1988.

Notice of Allowance for U.S. Appl. No. 16/717,081 dated Jun. 19, 2020.

CoinTelegraph, Mar. 14, 2019, "IBM publishes patent for resisting replay attacks", https://cointelegraph.com/news/ibm-publishes-patent-for-resisting-replay-attacks-in-permissioned-blockchains.

Written Opinion for Singaporean Application No. 11201904625Q dated Jul. 1, 2020.

Office Action for Korean Application No. 10-2019-7015102 dated Jul. 9, 2020.

Written Opinion for Singaporean Application No. 11201904383U dated Jul. 1, 2020.

Search Report for European Application No. 18866064.1 dated Dec. 20, 2019 (5 pages).

Li et al., "CreditCoin: A Privacy-Preserving Blockchain-Based Incentive Announcement Network for Communications of Smart Vehicles," IEEE Transactions on Intelligent Transporation Systems, vol. 19, No. 7, Jul. 2018 (17 pages).

Examination Report for European Application No. 18866064.1 dated Jan. 17, 2020 (5 pages).

Search Report for European Application No. 18867009.5 dated Dec. 19, 2019 (5 pages).Search Report for European Application No. 18867009.5 dated Dec. 19, 2019 (5 pages).

Examination Report for European Application No. 18867009.5 dated Jan. 28, 2020 (5 pages).

Non-Final Office Action for U.S. Appl. No. 16/717,081 dated Jun. 1, 2020.

Bitcoin Wiki, "Genesis Block", https://en.bitcoin.it/wiki/Genesis_Block, Nov. 30, 2017, pp. 1-3.

\* cited by examiner

400

441: obtaining at least one candidate transaction for adding to a blockchain, the obtained candidate transaction comprising a timestamp

442: verifying if the timestamp is within a validation range and if an identification of the candidate transaction exists in an identification database

443: in response to determining that the timestamp is within the validation range and the identification does not exist in the identification database, determining that the candidate transaction is not associated with a replay attack

451: obtaining at least one candidate transaction for adding to a blockchain

452: verifying if an identification of the candidate transaction exists in an identification database, the identification database comprising a plurality of identifications within a validation range 453: in response to determining that the identification does not exist in the identification database, determining that the candidate transaction is not associated with a replay attack

FIG. 4B

SYSTEM AND METHOD FOR DETECTING REPLAY ATTACK

CROSS REFERENCE TO RELATED APPLICATION

This application is a national phase application of International Application No. PCT/CN2018/125782, filed on Dec. 29, 2018, the contents of which are incorporated by reference in its entirety.

TECHNICAL FIELD

This application generally relates to methods and devices for detecting replay attack.

BACKGROUND

A replay attack (also known as playback attack, freshness attack, man-in-the-middle attack) is a form of network attack in which a valid data transmission is maliciously or fraudulently repeated or delayed. This may be carried out by the originator of the transmission to a node (e.g., server) or by an adversary who intercepts the data and re-transmits it to the node. For example, replay attack may be carried out as part of a masquerade attack by Internet Protocol (IP) packet substitution. Another way of describing replay attack is: an attack on a security protocol using replay of messages from a different context into the intended (or original and expected) context, thereby fooling the honest node(s) into thinking they have successfully completed the protocol run. For example, the protocol may be a blockchain transaction protocol. A blockchain may branch into two or more sub-chains which follow the same address, encryption key, and transaction system. A legitimate transaction on one sub-chain may be maliciously repeated on another sub-chain by a replay attack, causing loss to the sender.

Though blockchain is advantageous for various advantages over traditional networks, it is nonetheless susceptible to replay attacks. For example, a transaction sending 20 ethers from A to B through blockchain can be repeated by B in replay attacks to continually drain A's balance. Thus, replay attack detection is critical for fending off malicious blockchain operations and safekeeping personal properties.

SUMMARY

Various embodiments of the present application include systems, methods, and non-transitory computer readable media for detecting replay attack.

According to one aspect, a computer-implemented method for detecting replay attack comprises: obtaining at least one candidate transaction for adding to a blockchain; verifying if an identification of the candidate transaction exists in an identification database, the identification database comprising a plurality of identifications within a validation range; and in response to determining that the identification does not exist in the identification database, determining that the candidate transaction is not associated with a replay attack.

In some embodiments, the obtained candidate transaction comprises a timestamp; verifying if an identification of the candidate transaction exists in an identification database comprises verifying if the timestamp is within the validation range and if an identification of the candidate transaction exists in an identification database; and in response to determining that the identification does not exist in the identification database, determining that the candidate transaction is not associated with a replay attack comprises in response to determining that the timestamp is within the validation range and the identification does not exist in the identification database, determining that the candidate transaction is not associated with a replay attack.

In some embodiments, the candidate transaction comprises the timestamp and transaction information. After obtaining the at least one candidate transaction and before verifying if the identification of the candidate transaction exists in the identification database, the method further comprises: determining a hash value based at least on the timestamp and the transaction information, the hash value serving as the identification.

In some embodiments, the candidate transaction comprises the timestamp, transaction information, and a hash value determined based at least on the timestamp and the transaction information, the hash value serving as the identification. After obtaining the at least one candidate transaction and before verifying if the identification of the candidate transaction exists in the identification database, the method further comprises: verifying the identification by verifying the hash value based at least on the timestamp and the transaction information.

In some embodiments, the timestamp is configured by a user terminal that initiated the at least one candidate transaction; and obtaining the at least one candidate transaction for adding to the blockchain comprises receiving the candidate transaction from the user terminal.

In some embodiments, the timestamp is configured by a blockchain node; and obtaining the at least one candidate transaction for adding to the blockchain comprises: receiving at least one initiated transaction from a user terminal; and adding the timestamp to the initiated transaction to obtain the at least one candidate transaction.

In some embodiments, the method further comprises: in response to determining that the timestamp is within the validation range and the identification does not exist in the identification database, adding the identification to the identification database.

In some embodiments, the method further comprises: in response to determining that the timestamp is within the validation range and the identification does not exist in the identification database, adding the candidate transaction to a cache for storing candidate transactions.

In some embodiments, the method further comprises: in response to determining that the timestamp is not within the validation range, returning an error message to a computing device that submitted the candidate transaction.

In some embodiments, the method further comprises: in response to determining that the identification exists in the identification database, determining that the candidate transaction is associated with the replay attack.

In some embodiments, the method further comprises: performing consensus verification, wherein the candidate transaction is included in the consensus verification if the candidate transaction is determined not to be associated with the replay attack.

In some embodiments, the method further comprises: synchronizing the identification database with one or more other blockchain nodes; verifying if the timestamp is within the validation range and if the identification of the candidate transaction exists in the synchronized identification database; in response to determining that the timestamp is within the validation range and the identification does not exist in the identification database, determining that the candidate transaction is not associated with the replay attack; and in response to determining that the identification exists in the synchronized identification database, determining that the candidate transaction is associated with the replay attack.

In some embodiments, before obtaining the at least one candidate transaction, the method further comprises: synchronizing the identification database with one or more other blockchain nodes.

In some embodiments, the identification database comprises information of transactions with timestamps within a recent time period corresponding to the validation range.

In some embodiments, the validation range is based on another timestamp of a latest block of the blockchain; and the validation range is included in a genesis block of the blockchain.

In some embodiments, the validation range is based on an internal clock of a blockchain node that performs the verifying if the timestamp is within the validation range.

According to another aspect, a system for detecting replay attack comprises one or more processors and one or more non-transitory computer-readable memories coupled to the one or more processors and configured with instructions executable by the one or more processors to cause the system to perform operations comprising: obtaining at least one candidate transaction for adding to a blockchain; verifying if an identification of the candidate transaction exists in an identification database, the identification database comprising a plurality of identifications within a validation range; and in response to determining that the identification does not exist in the identification database, determining that the candidate transaction is not associated with a replay attack.

According to another aspect, a non-transitory computer-readable storage medium is configured with instructions executable by one or more processors to cause the one or more processors to perform operations comprising: obtaining at least one candidate transaction for adding to a blockchain; verifying if an identification of the candidate transaction exists in an identification database, the identification database comprising a plurality of identifications within a validation range; and in response to determining that the identification does not exist in the identification database, determining that the candidate transaction is not associated with a replay attack.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 4A illustrates a flowchart of an exemplary method for detecting replay attack, in accordance with various embodiments.

FIG. 4B illustrates a flowchart of an exemplary method for detecting replay attack, in accordance with various embodiments.

DETAILED DESCRIPTION

Figure 1:
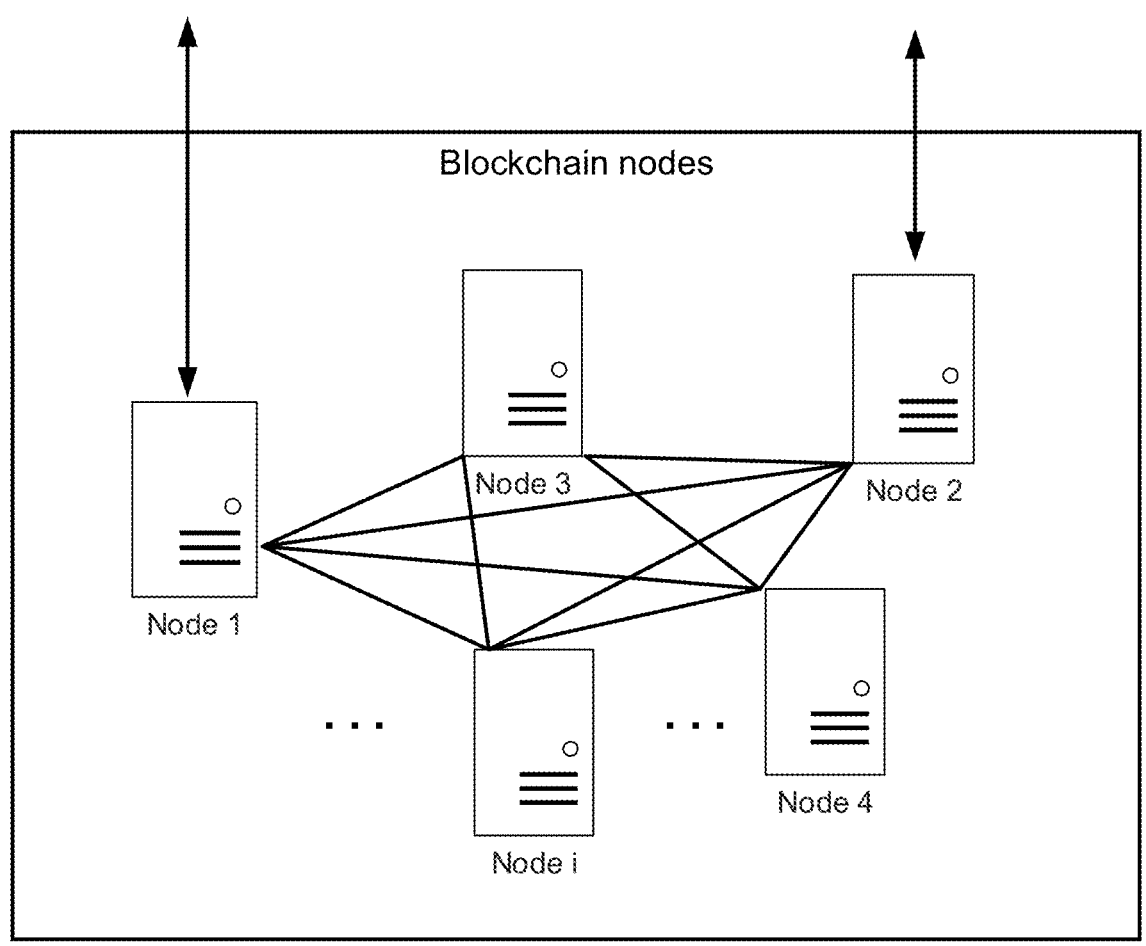
FIG. 1 illustrates an exemplary system for detecting replay attack, in accordance with various embodiments.

Blockchain may be considered as a decentralized database, commonly referred to as a distributed ledger because the operation is performed by various nodes (e.g., computing devices) in a network. Any information may be written to the blockchain and saved or read from ft. Nodes are, for example, computing devices or large computer systems that support the blockchain network and keep it running smoothly. Each node may provide a part or all of the functions of the blockchain. For example, a node that provides consensus verification may be referred to as a consensus-participating node (or consensus node).

In various embodiments, consensus may be an algorithm of rules for a network of blockchain nodes to achieve commonly-accepted processing results. For example, blockchain nodes may receive the transactions in different order due to network lag, the issue of which can be tackled by consensus. In one example, under the "proof of work" consensus system, the blockchain nodes may comprise devices of miners applying their hardware or computational power to verify the blocks of blockchain and receiving rewards. Producing a proof of work can be a random process with low probability so that a lot of trial and error is required on average before a valid proof of work is generated. Bitcoin uses the Hashcash proof of work system. In another example, under the "proof of stake/service" consensus system, blockchain nodes with certain level of voting power may be referred to as consensus/master/primary nodes, which assume the responsibility of transaction verification, as opposed to non-consensus nodes. Consensus nodes may generate new blockchain blocks and make decisions for the blockchain, for example, setting the service fees for the blockchain. The consensus nodes may be associated with a large amount of cryptocurrencies and verify new transactions based on certain consensus rules mutually agreed upon. Based on the rule for determining the consensus nodes, proof of stake/service consensus system may be implemented as the chain-based proof of stake/service consensus system, the Byzantine Fault Tolerance algorithm (BFT) proof of stake/service consensus system, etc. In this specification, full nodes, consensus nodes, or other equivalent nodes in the disclosed or another blockchain system can verify the transactions as the blockchain nodes. For example, the blockchain system may comprise a public blockchain, a consortium blockchain, a private blockchain, etc.

Different from the UTXO (unspent transaction output) model, ethereum is based on the Account/Balance model (or referred to as Account-based Transaction Model), which keeps track of the balance of each account as a global state. In a transaction, the balance of an account is checked to make sure it is larger than or equal to the spending transaction amount. An example of how Account/Balance model works in ethereum is provided:

1. Alice gains 5 ethers through mining. It is recorded in the system that Alice has 5 ethers.

2. Alice wants to give Bob 1 ether, so the system will first deduct 1 ether from Alice's account, so Alice now has 4 ethers.

3. The system then increases Bob's account by 1 ether. The system knows that Bob has 2 ethers to begin with, therefore Bob's balance is increased to 3 ethers.

Under the Account/Balance Model, the blockchain nodes store the most recent state of each smart contract, in addition to all of the ether transactions. For each ethereum application, the network may keep track of the "state" or the current information, including an account nonce, each user's balance, all the smart contract code (e.g., binary code), storage space (e.g., for storing hashes).

Unlike the UTXO model that prevents replay attacks or double-spending by defining the available balance as unspent amount from the previous transaction, the traditional Account/Balance model uses the account nonce as a mechanism to screen replay attacks. The account nonce is a transaction counter in each account for preventing replay attacks. Though both may exist in the Account/Balance model, the account nonce may be distinguished from the proof of work nonce in proof of work consensus systems, which is a meaningless value in a block that can be adjusted in order to try to satisfy the proof of work condition under the UTXO model. Though described mostly with reference to the Account/Balance model (proof of stake/service system), the disclosed systems and methods are not limited to applications under the Account/Balance model (e.g., the ethereum system).

A replay attack is often used to illegally procure benefits by double-spending a certain asset. In order for a double-spend to be "successful," a malicious user typically: sends a transaction to one party, waits for it to register, collects something in return from this first transaction, quickly sends another transaction with a high gas price (price of computation on ethereum), and has the second transaction mined first therefore invalidating the first transaction. The second transaction is often a duplicate of the first transaction with some changes (e.g., time, gas price, receiver, or another parameter configured by the sender). The second transaction may use the same identification (e.g., hash) of the first transaction. Since the higher gas price may attract miners to first mine the second transaction, having the second transaction mined before the first transaction may allow the malicious user to keep the return from the first transaction while have the second transaction executed, thus achieving double-spending. The use of account nonce intends to eliminate this problem.

When making a transaction in ethereum, a consecutive number is attached to each transaction on the same account as the account nonce. Thus, the account nonce may also indicate the number of transactions sent from a given account address. The account nonce is maintained by the blockchain network, including its nodes. Each node will process transactions from a specific account in a strict order according to the value of its account nonce. Therefore, failing to increment the account nonce value correctly can result in different kinds of errors. For instance, assuming the latest account nonce is 121, if the account owner sends a new transaction for the same account with an account nonce of either 121 or below (in an attempt to reuse the account nonce), the node will reject it. Under the same assumption, if the account owner sends a new transaction with an account nonce of either 123 or higher, the transaction will not be processed until this gap is closed, i.e., until a transaction with account nonce 122 has been processed.

As described in the background section, replay attack detection is critical for fending off malicious blockchain operations and safekeeping personal properties. Though blockchain is advantageous for decentralized consensus verification, it is nonetheless susceptible to replay attacks. In particular, the account nonce mechanism has certain disadvantages or deficiencies. For example, to initiate a transaction, the user terminal may need to first obtain the account nonce from the blockchain node, adding communication burden to the blockchain node. For another example, the account nonce mechanism is unreliable for a number of situations as follows. In situation (1), an account sends a first transaction and subsequently a second transaction both with the same transaction fee to the same blockchain node. However, if the blockchain node receives the second transaction before the first transaction due to unordered network data pack transmissions, the blockchain node will execute the second transaction and then the first transaction, causing execution failures for both transactions due to incompliance with the account nonce mechanism. In situation (2), an account sends a first transaction and subsequently a second transaction to the same blockchain node, with the second transaction having a higher transaction fee. To maximize gain, the blockchain nodes may be programmed to preferentially execute the second transaction and then the first transaction, causing execution failures for both transactions due to incompliance with the account nonce mechanism. In situation (3), an account sends different transactions in parallel from various user terminals, but these transactions will have the same account nonce value. As a result, at most one of the transactions will be successfully processed.

To at least mitigate the deficiencies of current technologies, provide a technical solution to the above-described technical problem, and improve computer functionalities, systems and methods for detecting replay attack are disclosed. As discussed below, in various embodiments, a combination of timestamp verification and transaction identification verification may be used to replace the use of account nonce to achieve robust replay attack detection. Accordingly, malicious transactions can be timely identified from honest transactions and discarded.

FIG. 1 shows an exemplary system 100 for performing various disclosed steps and methods, in accordance with various embodiments. As shown, a blockchain network may comprise a plurality of blockchain nodes (e.g., node 1, node 2, node 3, node 4, node i, etc.). The blockchain nodes may form a network (e.g., peer-to-peer network) with one blockchain node communicating with another. The order and the number of the blockchain nodes as shown are merely exemplary and for the simplicity of illustration. The blockchain nodes may be implemented in servers, computers, etc. Each blockchain node may correspond to one or more physical hardware devices or virtual devices coupled together via various types of communication methods such as TCP/IP. Depending on the classifications, the blockchain nodes may comprise full nodes, Geth nodes, consensus nodes, etc.

In various embodiments, user A and user B may use corresponding devices such as laptops and mobile phones to trigger the blockchain nodes to execute transactions, which may or may not involve blockchain contracts (e.g., smart contracts). In one example, user A may want to transact with user B by transferring some asset in user A's account to user B's account. User A and user B may use corresponding devices node A and node B (also referred to as user terminals) installed with an appropriate blockchain software (e.g., cryptocurrency wallet) to initiate, forward, or access the transaction. User A's device node A may be referred to as an initiator node that initiates a transaction with user B's device node B referred to as recipient node. Node A may access the blockchain through communication with node 1, and node B may access the blockchain through communication with node 2. Node A, node B, or similar nodes may submit transactions to the blockchain through node 1, node 2, or similar nodes to request adding the transactions to the blockchain. Off the blockchain, node A and node B may have other channels of communication (e.g., regular internet communication without going through nodes 1 and 2). In some embodiments, the blockchain software on node A may be considered as a front-end of the blockchain node 1, and the blockchain node 1 runs a back-end of the blockchain software.

Each of the nodes in FIG. 1 may comprise a processor and a non-transitory computer-readable storage medium configured with instructions executable by the processor to cause the node (e.g., the processor) to perform various operations for detecting replay attack described herein. The each node may be installed with a software (e.g., transaction program) and/or hardware (e.g., wires, wireless connections) to communicate with other nodes and/or other devices. For example, user devices such as node A and node B may be installed with a user-end software such as cryptocurrency wallet, and the blockchain nodes may be installed with a blockchain transaction processing software. Further details of the node hardware and software are described later with reference to FIG. 5 to FIG. 7.

The blockchain nodes may each comprise or couple to a memory. In some embodiments, the memory may store a pool database. The pool database may be accessible to the plurality of blockchain nodes in a distributed manner. For example, the pool database may be respectively stored in the memories of the blockchain nodes. The pool database may store a plurality of transactions submitted by the one or more user devices such as nodes A and B operated by users. In some embodiments with respect to an ethereum system, after receiving a transaction request of an unconfirmed transaction, the recipient blockchain node may perform some preliminary verification of the transaction. For example, referring to FIG. 1, node 1 may perform the preliminary verification after receiving a transaction from node A. Once verified, the transaction may be stored in the pool database of the recipient blockchain node, which may also forward the transaction to one or more other blockchain nodes (e.g., node 3, node 4) which repeat the process done by the recipient node. Once the transactions in the corresponding pool database reach certain level, the blockchain nodes may each verify the batch of transactions in the corresponding pool database according to consensus rules or another method. If the transaction involves a blockchain contract, the blockchain node may execute the blockchain contract locally. A certain blockchain node that successfully verifies its batch of transactions (for example, in accordance with consensus rules) may pack the transactions to add to its local copies of the blockchain and spread the results to other blockchain nodes. The certain blockchain node may be one that first completes the successful verification, that has obtained the verification privilege, or that determined based on another consensus rule. The other blockchain nodes may execute the transactions locally, verify the execution results with one another (e.g., by performing hash calculation), and synchronize their copies of the blockchain with that of the certain blockchain node. By updating the local copies of the blockchain, the blockchain nodes may write such information into the local memories. If the verification fails at some point, the transactions are rejected.

Figure 2:
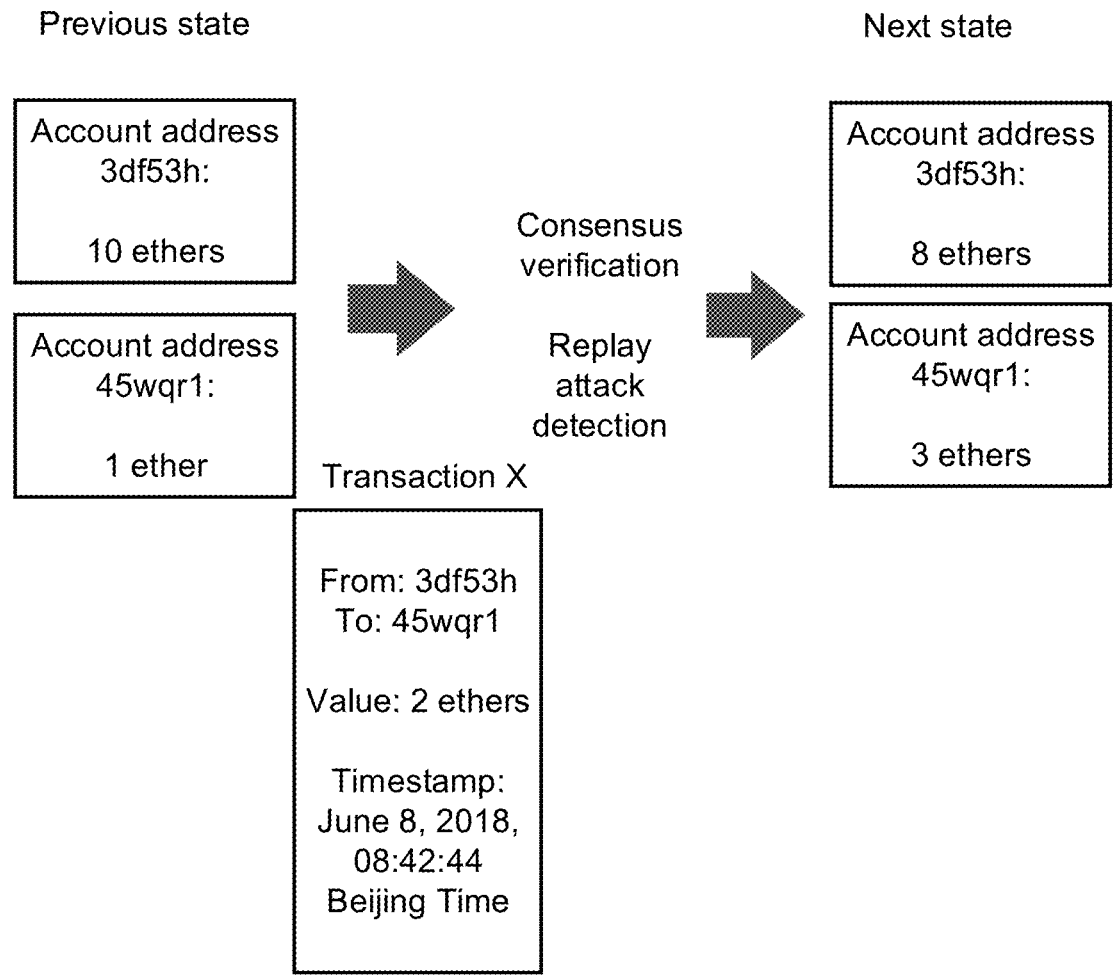
FIG. 2 illustrates an exemplary transaction for which replay attack detection is employed, in accordance with various embodiments.

FIG. 2 illustrates an exemplary transaction for which replay attack detection is employed, in accordance with various embodiments.

In some embodiments, an initiator node may initiate a transaction X of 2 ethers from an account of address 3df53h (account A) to an account of address 45wqr1 (account B). Account A has 10 ethers, and account B has 1 ether before the transaction. The transaction X be may submitted by the initiator node (e.g., computer, mobile phone) to a blockchain node (e.g., full node). The transaction X may be associated with a timestamp, e.g., a time when the transaction X is submitted by the initiator node through a blockchain node, when the transaction X is submitted by the blockchain node, or when the transaction X is received by another blockchain node that performs consensus verification. The transaction X may be referred to as a candidate transaction before it is verified and added to the blockchain. The blockchain node may save the candidate transaction X in a pool database along with other candidate transactions. The blockchain node may save an identification (e.g., hash) of the transaction X to an identification database (e.g., a hash table).

In some embodiments, a plurality of the blockchain nodes may verify the candidate transactions of the pool database according to consensus rules. For example, the blockchain nodes may verify if the sending accounts have sufficient funds, if the sending and receiving parties have signed off the transaction, if the transaction amount is in an allowed range, etc. By consensus verification, the blockchain nodes may synchronize their identification databases to include all identifications of transactions stored in the identification databases. For example, the identification databases may each store transactions for a certain recent time period. For replay attack detection, the blockchain nodes may verify if the timestamp of the candidate transaction is within the recent time period, and if so, screen the candidate transaction against the identification database for replay attack.

The timestamp and identification verifications may be performed once after the consensus verification or performed twice: before and after the consensus verification. If compliance is satisfied, the blockchain nodes may pack the verified candidate transactions into a new block to add to the blockchain. Accordingly, when transaction X is added to the blockchain, the transaction X of account A transferring the 2 ethers to account B is recognized.

Figure 3:
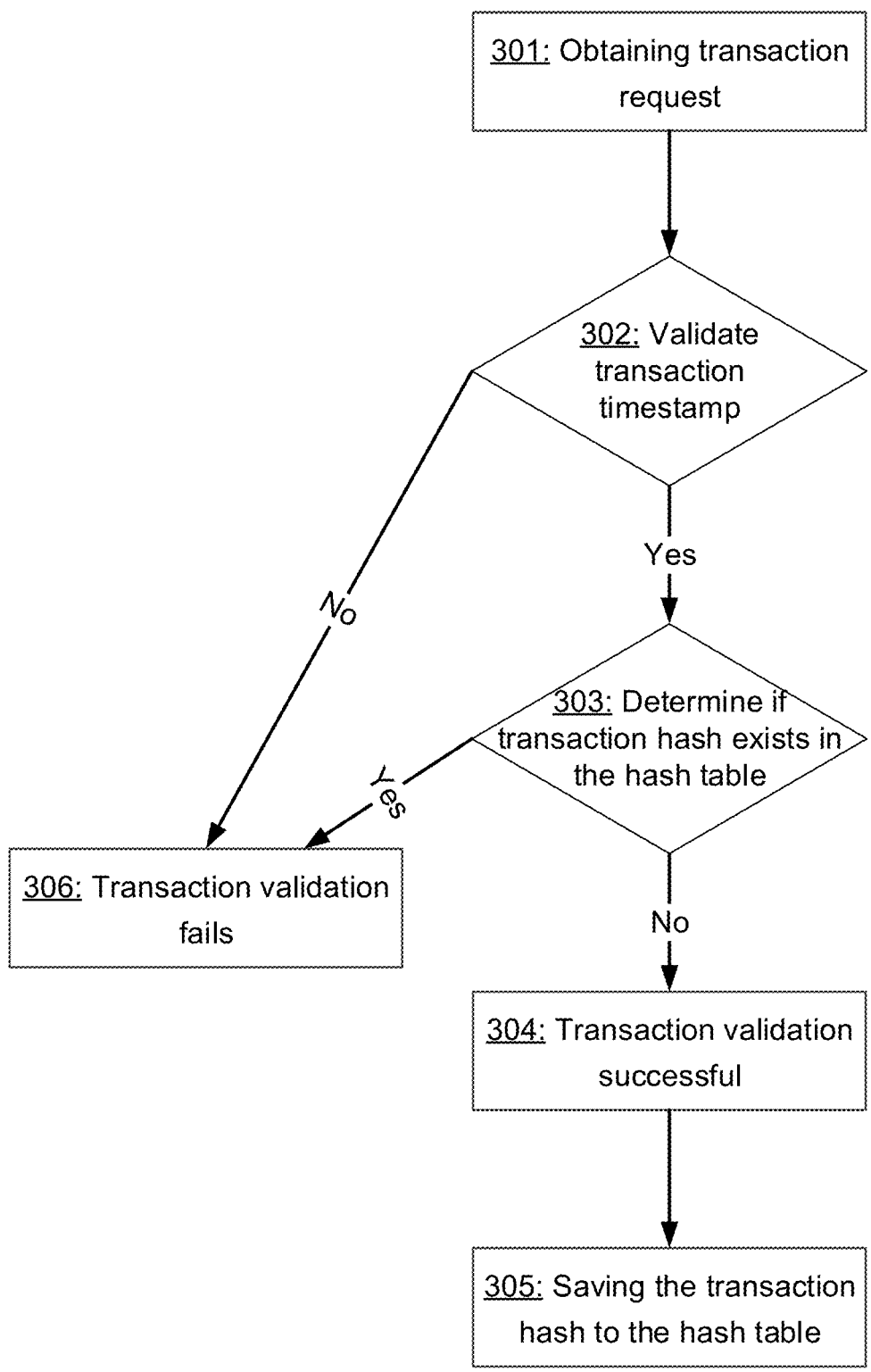
FIG. 3 illustrates a flowchart of an exemplary method for detecting replay attack, in accordance with various embodiments.

FIG. 3 illustrates exemplary steps 300 for replay attack detection, in accordance with various embodiments. The steps 300 may be implemented by one or more components (e.g., node A, node 1, a combination of node A and node 1, node 2, node i) of the system 100 of FIG. 1. The operations presented below are intended to be illustrative. Depending on the implementation, the exemplary steps 300 may include additional, fewer, or alternative steps performed in various orders or in parallel.

In various embodiments, as described earlier, a timestamp is added to the transaction, for example, under the Account/Balance Model. In one example, the transaction initiator node (e.g., node A in FIG. 1) or an alternative user terminal may add the timestamp (e.g., a timestamp parameter) to a submission of unconfirmed transaction for the blockchain nodes to validate. Alternatively, a blockchain node receiving the unconfirmed transaction (e.g., node 1 in FIG. 1) may add the timestamp. The timestamp may be accurate to various levels (e.g., to milli-second level). With the increasing accuracy of timestamp, the disclosed systems and methods can support more transactions initiated by one account within a unit time. For example, if the timestamp is accurate to 10 ms, the disclosed systems and methods can at best support about 100 different transactions initiated by the same account logged on 100 different user terminals, while keeping out those intended as replay attacks.

In some embodiments, a validation range may be used to at least overcome the above-described disadvantages of account nonce. The validation range is a time window in which the recent transactions are screened for replay attacks. The validation range may be defined in relation to a universal standard, e.g., within a time period from the timestamp of the latest block of the blockchain since the timestamp of the latest block is universally accepted in the blockchain. For example, the latest block of the blockchain may be added on Jun. 8, 2018 at 08:42:44 Beijing time, and the validation range may be two hours before and/or after that time. Before consensus verification, a node's local time (e.g., based on an internal clock) can be alternatively used. Before and after consensus verification, if a node's internal clock is substantially consistent with the universal standard, the node's local time can be alternatively used. The validation range may be long enough for sustaining replay attack detection efficiency and short enough to limit data storage requirement. The validation range may be included in the genesis block (the first ever block) of the blockchain to ensure that each blockchain node agrees to and uses the same validation range. With the validation range, the replay attack detection does not require synchronization between the initiator node's time and the time of the blockchain node, nor the system times among different blockchain nodes. Also, blockchain nodes may verify the same candidate transaction at different times and still obtain the same result.

In some embodiments, upon receiving a candidate transaction, a blockchain node can validate the timestamp of the candidate transaction based on the validation range. With successful timestamp validation and no detection of replay attack, the blockchain node may also store an identification of the candidate transaction in the validation range. For example, the blockchain node may store the hash of the validated transaction in a transaction hash table in a memory (e.g., cache) of the blockchain node. The cache storage can enable fast data query from the transaction hash table, thus increasing the overall transaction efficiency (e.g., increasing the number of transactions per second). The stored hash table may store information within the most recent time period corresponding to the validation range (e.g., the last two hours). By imposing the validation range, blockchain nodes no longer have to search the entire blockchain for replay attacks, which often takes a long time by searching from a hard disc and also increases with blocks continuously being added to the blockchain. By contrast, searching from a cache memory corresponding to the information collected from the validation range can significantly improve the efficiency for replay attack detection. A break-down of the steps are described below.

At step 301, a blockchain node may obtain a candidate transaction submitted by an initiator node for verification and adding to the blockchain. At step 302, the blockchain node may validate the transaction timestamp. If the validation succeeds, step 303 is performed, and the blockchain node determines if the transaction hash of the candidate transaction exists in the hash table. The hash table may store the hashes of all transactions for a time period corresponding to the validation range. If the transaction hash of the candidate transaction is already in the hash table, it indicates that the candidate transaction may be related to a replay attack and the validation fails. Otherwise, the validation is successful at step 304, and the blockchain node saves the transaction hash to the hash table at step 305. If the validation in step 302 fails, step 306 is performed, and an error message may be returned to the user terminal that submitted the transaction. If the determination in step 303 fails, step 306 is performed, and the transaction having the earliest timestamp is treated as an authentic transaction, and all later transactions are regarded as potential replay attacks and discarded. The hashes of the later transactions may also be purged from the hash table.

In some embodiments, for the consensus agreement that allows each node to initiate mining of the transaction (verifying the transaction according to consensus rules), the replay attack may target various blockchain nodes, and the targeted blockchain nodes are unable to detect the threat before performing the verification of the transaction according to consensus rules. Thus, after the blockchain nodes perform the verification of the transaction according to consensus rules, the blockchain nodes can obtain the complete information of the hash table and perform the steps 302 to 305 to screen for replay attacks. Thus, the steps 302 to 305 may be performed after the blockchain node performs the verification of the transaction according to consensus rules. Nevertheless, the steps 302 to 305 may be additionally performed before the blockchain node performs the verification of the transaction according to consensus rules. By performing the steps 302 to 305 before the verification of the transaction can preliminarily weed out potential replay attacks. That is, the steps 302 to 305 may be performed (1) both before and after or (2) after the verification of the transaction according to consensus rules. Whether performed once or twice, the step 302 and the step 303 may be performed in any order without affecting the results.

FIG. 4A illustrates a flowchart of an exemplary method 400 for detecting replay attack, according to various embodiments of this specification. The method 400 may be implemented by one or more components (e.g., node 1, a combination of node A and node 1, node 2, . . . , node i) of the system 100 of FIG. 1. The method 400 may be implemented by one or more blockchain nodes. The method 400 may be implemented by a system or device (e.g., computer, server). The system or device may comprise one or more processors and one or more non-transitory computer-readable storage media (e.g., one or more memories) coupled to the one or more processors and configured with instructions executable by the one or more processors to cause the system or device (e.g., the processor) to perform the method 400. The operations of method 400 presented below are intended to be illustrative. Depending on the implementation, the exemplary method 400 may include additional, fewer, or alternative steps performed in various orders or in parallel.

Block 441 comprises: obtaining at least one candidate transaction for adding to a blockchain, the obtained candidate transaction comprising a timestamp.

Block 442 comprises: verifying if the timestamp is within a validation range and if an identification (e.g., the hash value or an alternative identification) of the candidate transaction exists in an identification database (e.g., a hash table).

Block 443 comprises: in response to determining that the timestamp is within the validation range and the identification does not exist in the identification database, determining that the candidate transaction is not associated with a replay attack.

The various terms, embodiments, and examples of method 450 described below may be similarly applicable to the method 400.

FIG. 4B illustrates a flowchart of an exemplary method 450 for detecting replay attack, according to various embodiments of this specification. The method 450 may be implemented by one or more components (e.g., node 1, a combination of node A and node 1, node 2, . . . , node i) of the system 100 of FIG. 1. The method 450 may be implemented by one or more blockchain nodes. The method 450 may be implemented by a system or device (e.g., computer, server). The system or device may comprise one or more processors and one or more non-transitory computer-readable storage media (e.g., one or more memories) coupled to the one or more processors and configured with instructions executable by the one or more processors to cause the system or device (e.g., the processor) to perform the method 450. The operations of method 450 presented below are intended to be illustrative. Depending on the implementation, the exemplary method 450 may include additional, fewer, or alternative steps performed in various orders or in parallel.

Block 451 comprises: obtaining at least one candidate transaction for adding to a blockchain. The obtained candidate transaction may comprise a timestamp. In some embodiments, the blockchain may be based on the Account/Balance Model (e.g., the ethereum system, a BFT system such as Practical Byzantine Fault Tolerance (PBFT) system, a HoneyBadger or Hashgraph system), but with the disclosed system replacing the use of account nonce (if present) for detecting replay attack.

In some embodiments, the obtained candidate transaction comprises a timestamp. The candidate transaction comprises the timestamp, transaction information, and a hash value determined based at least on the timestamp and the transaction information, the hash value serving as the identification. After obtaining the at least one candidate transaction and before verifying if the identification of the candidate transaction exists in the identification database, the method further comprises: verifying the identification by verifying the hash value based at least on the timestamp and the transaction information. For example, the candidate transaction may comprise one or more parameters such as the timestamp, from (transaction sender address), to (transaction recipient address), value (transacting item), data (blockchain contract if present), payment for the transaction (e.g., Gas Limit, Gas Value), hash value (a hash value for using as a unique identification of the transaction), and/or other information (e.g., signature (proof of sign-off by the sender)). Such parameters may be collectively referred to as a transaction structure body. The included parameters other than the timestamp (and the signature) may be referred to as the transaction information. The hash value may be determined (e.g., by a node such as node A that initiated the candidate transaction) based on the transaction information, for example, through a hash function taking the timestamp and the transaction information as inputs. To verify the hash value based at least on the timestamp and the transaction information, the blockchain node (e.g., node 1) that obtains the candidate transaction may re-calculate the hash function with the inputs to check against the hash value.

In some embodiments, the candidate transaction comprises the timestamp and transaction information. After obtaining the at least one candidate transaction and before verifying if the identification of the candidate transaction exists in the identification database, the method further comprises: determining a hash value based at least on the timestamp and the transaction information, the hash value serving as the identification. For example, the candidate transaction may comprise one or more parameters such as the timestamp, from, to, value, data, payment for the transaction, and/or other information. The included parameters other than the timestamp may be referred to as the transaction information. The hash value may be determined (e.g., by a blockchain node such as node 1 that received the candidate transaction) based on the timestamp and the transaction information, for example, through a hash function taking the timestamp and the transaction information as inputs.

In some embodiments, the timestamp is configured by a user terminal that initiated the at least one candidate transaction; and obtaining the at least one candidate transaction for adding to the blockchain comprises receiving the candidate transaction from the user terminal. For example, the user terminal may be the node A in FIG. 1, which transmits the candidate transaction to the node 1. Node A may have added the timestamp to the candidate transaction before transmitting the candidate transaction to node 1.

In some embodiments, the timestamp is configured by a blockchain node; and obtaining the at least one candidate transaction for adding to the blockchain comprises: receiving at least one initiated transaction from a user terminal; and adding the timestamp to the initiated transaction to obtain the at least one candidate transaction. For example, the user terminal may be the node A in FIG. 1, which transmits the candidate transaction to the node 1. Node A may have not added the timestamp to the candidate transaction, and node 1 may add the timestamp to the received candidate transaction. As a first blockchain node receiving the candidate transaction, node 1 may add the timestamp based on its internal clock or an alternative time source. Once other blockchain nodes later receive the candidate transaction, the other blockchain nodes may obtain the timestamp added by node 1.

Block 452 comprises: verifying if an identification (e.g., the hash value or an alternative identification) of the candidate transaction exists in an identification database (e.g., hash table of a pool database), the identification database comprising a plurality of identifications within a validation range.

In some embodiments, verifying if an identification of the candidate transaction exists in an identification database comprises verifying if the timestamp is within the validation range and if an identification of the candidate transaction exists in an identification database. The verification of the timestamp and the verification of the identification can be performed in any order. The identification database may be stored in the storage medium. The identification database may be stored in a cache memory.

In some embodiments, the identification database comprises information of transactions with timestamps within a recent time period corresponding to the validation range. For example, each blockchain node may maintain an identification database to store hashes of candidate transactions received by the blockchain node for two hours from the timestamp of the latest block of the blockchain. The blockchain nodes may synchronize their identification databases at each consensus verification to pool the stored hashes. After each consensus verification, a new block may be added to the blockchain, and the timestamp of the latest block of the blockchain progresses in time. For example, the latest block of the blockchain may be added at 5 am of a certain date, and the validation range may be 5 am to 7 am of the certain date. Then, after a new block is added at 7 am, the validation range becomes 7 am to 9 am of the certain date. Accordingly, the hashes in the identification database may be updated by adding hashes within the validation range and/or removing hashes outside the validation range. Each hash may be associated with the corresponding timestamp to determine if the hash is within or outside the validation range.

In some embodiments, the validation range is based on another timestamp of the latest block of the blockchain (e.g., the another timestamp which is universally agreed by the blockchain network+the validation range from the another timestamp); and the validation range is included in a genesis block of the blockchain.

In some embodiments, the validation range is based on an internal clock of a blockchain node that performs the verifying if the timestamp is within the validation range.

Block 453 comprises: in response to determining that the identification does not exist in the identification database, determining that the candidate transaction is not associated with a replay attack. In some embodiments, in response to determining that the identification does not exist in the identification database, determining that the candidate transaction is not associated with a replay attack comprises in response to determining that the timestamp is within the validation range and the identification does not exist in the identification database, determining that the candidate transaction is not associated with a replay attack.

In some embodiments, the method 450 further comprises: in response to determining that the timestamp is within the validation range and the identification does not exist in the identification database, adding the identification to the identification database.

In some embodiments, the method 450 further comprises: in response to determining that the timestamp is within the validation range and the identification does not exist in the identification database, adding the candidate transaction to a cache for storing candidate transactions. For example, the cache may be the pool database. The cache may also store the identification database (e.g., a hash table).

In some embodiments, the method 450 further comprises: in response to determining that the timestamp is not within the validation range, returning an error message to a computing device that submitted the candidate transaction. The candidate transaction may or may not be associated with the replay attack, but is nonetheless an invalid transaction because it is outside the validation range (e.g., too long ago from the current time). Thus, the candidate transaction is rejected for adding to the blockchain.

In some embodiments, the method 450 further comprises: in response to determining that the identification exists in the identification database, determining that the candidate transaction is associated with the replay attack. Thus, the candidate transaction is rejected for adding to the blockchain.

The method 450 may be implemented in various blockchain systems such as the ethereum system, the PBFT system, the HoneyBadger or Hashgraph system, etc. In some embodiments, the method further comprises: performing consensus verification, wherein the candidate transaction is included in the consensus verification if the candidate transaction is determined not to be associated with the replay attack. For example, in ethereum system, the timestamp and identification verification may be performed before consensus nodes perform a round of consensus verification. In any of the disclosed blockchain systems, performing the consensus verification may not be able to detect replay attack, and the disclosed methods may achieve replay attack detection.

In some embodiments, the method 450 further comprises: synchronizing the identification database with one or more other blockchain nodes; verifying if the timestamp is within the validation range and if the identification of the candidate transaction exists in the synchronized identification database; in response to determining that the timestamp is within the validation range and the identification does not exist in the identification database, determining that the candidate transaction is not associated with the replay attack; and in response to determining that the identification exists in the synchronized identification database, determining that the candidate transaction is associated with the replay attack. For example, in ethereum system, optionally, the timestamp and identification verification may be performed again after the consensus nodes perform the round of consensus verification. By the consensus verification, the identification database and/or the pool database may be synchronized among the blockchain nodes.

In some embodiments, before obtaining the at least one candidate transaction, the method 450 further comprises: synchronizing the identification database with one or more other blockchain nodes. For example, in the PBFT system, a single blockchain node (e.g., the primary node) may be in charge of initiating consensus verification. After receiving candidate transactions, non-primary blockchain nodes (e.g., backup nodes) may forward the candidate transactions to the primary node. The primary node may perform the method 450 after receiving the candidate transactions and before the consensus verification is performed. After the consensus verification is performed, the non-primary nodes may synchronize their list of candidate transactions with the primary node to execute the candidate transactions. Thus, the non-primary nodes may or may not perform the method 450 after the consensus verification and before executing the candidate transactions.

For another example, in the HoneyBadger or Hashgraph system, each blockchain node may not forward the candidate transaction that it receives. Each blockchain node may initiate consensus verification for the received candidate transaction. Thus, if an authentic transaction and a replay attack transaction are sent respectively to two different blockchain nodes that each perform the method 450, they may both pass. To detect the replay attack, after the consensus verification is performed, the blockchain nodes may share the candidate transactions through the consensus verification and then perform the method 450 again. That is, the blockchain nodes in the HoneyBadger or Hashgraph system may synchronize their identification database and/or their pool databases and perform the method 450. With the method 450 performed after consensus verification, the blockchain nodes may add new transactions to the blockchain (e.g., by writing the updated blockchain into local storage memories).

As such, the disclosed systems and methods can mitigate or overcome the deficiencies in existing technologies to achieve robust replay attack detection. By replacing the account nonce with the disclosed combination of timestamp and identification verifications, user terminals no longer need to query the blockchain node for nonce values. Thus, communication costs between user terminals and blockchain nodes are lowered.

For the situation (1), an account sends a first transaction and subsequently a second transaction both with the same transaction fee to the same blockchain node. However, if the blockchain node receives the second transaction before the first transaction due to unordered network data pack transmissions, the blockchain node will execute the second transaction and then the first transaction, causing execution failures for both transactions due to incompliance with the account nonce mechanism. The disclosed systems and methods may replace the account nonce mechanism with timestamp and/or identification verification, such that the valid transactions from the same account may not have to be executed in a predefined order. That is, the order of receiving the valid transactions from the same account will not prevent successful execution of the transactions.

For the situation (2), an account sends a first transaction and subsequently a second transaction to the same blockchain node, with the second transaction having a higher transaction fee. To maximize gain, the blockchain nodes may be programmed to preferentially execute the second transaction and then the first transaction, causing execution failures for both transactions due to incompliance with the account nonce mechanism. The disclosed systems and methods can prevent this issue since, similar to the situation (1), the order of receiving the valid transactions from the same account will not prevent successful execution of the transactions.

In situation (3), an account sends different transactions in parallel from various user terminals, but these transactions will have the same account nonce value. As a result, at most one of the transactions will be successfully processed under the account nonce mechanism. The disclosed systems and methods can prevent this issue and allow successful execution of all transactions, since the account nonce is dropped. Also, as discussed earlier, the accuracy of the timestamp can support execution of a large number of transactions initiated by the same account substantially close in time before a new block is added.

In addition, screening the replay attack before and after (or just after) verifying the candidate transaction according to consensus rules of the blockchain can reduce the burden of the original consensus verification which included verifying the account nonce. The use of validation range significantly reduces the size of the database to search from and obviates the need for searching the entire blockchain. Thus, the identification database allows screening for replay attacks in a highly efficient and low-cost manner. Further, the association of the timestamp with a validation range allows submission of multiple transactions from the same account in any order without causing disruption to the transaction processing. Also, this validation range obviates requiring synchronizations between the user terminals and the blockchain nodes, and blockchain nodes can verify the same transaction at different times to achieve the same verification result.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
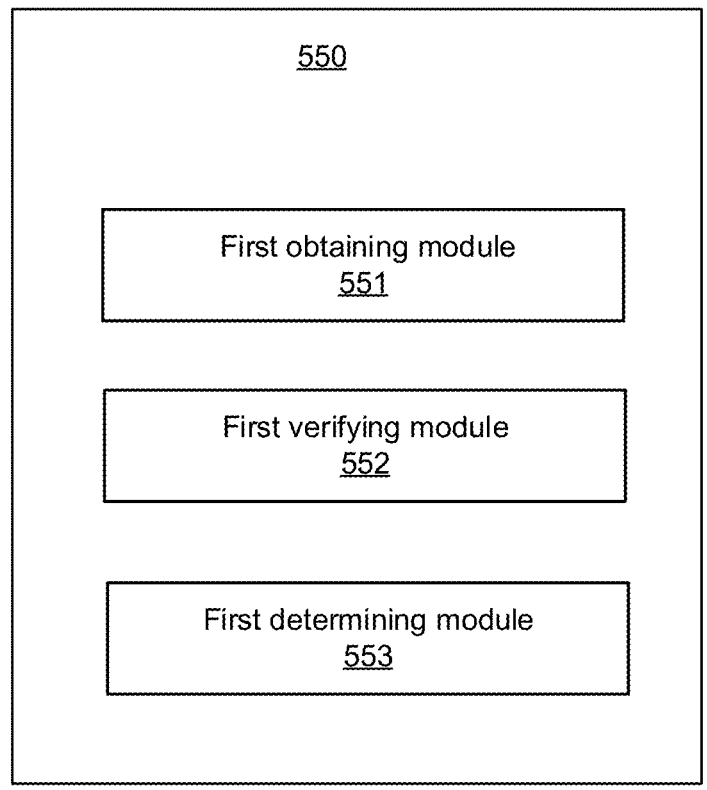
FIG. 5 illustrates a block diagram of an exemplary computer system for detecting replay attack, in accordance with various embodiments.

FIG. 5 illustrates a block diagram of an exemplary computer system 550 for implementing blockchain contract, in accordance with various embodiments. The system 550 may be an exemplary implementation of node 1, a combination of node A and node 1, node 2, . . . , node i of the system 100 of FIG. 1 or a similar device. The method 400 may be implemented by the computer system 550. The computer system 550 may comprise one or more processors and one or more non-transitory computer-readable storage media (e.g., one or more memories) coupled to the one or more processors and configured with instructions executable by the one or more processors to cause the system or device (e.g., the processor) to perform the method 400. The computer system 550 may comprise various units/modules corresponding to the instructions (e.g., software instructions). In some embodiments, the computer system 550 may comprise a first obtaining module 551 configured to obtain at least one candidate transaction for adding to a blockchain, the obtained candidate transaction comprising a timestamp; a first verifying module 552 configured to verify if the timestamp is within a validation range and if an identification of the candidate transaction exists in an identification database; and a first determining module 553 configured to, in response to determining that the timestamp is within the validation range and the identification does not exist in the identification database, determine that the candidate transaction is not associated with a replay attack.

Figure 6:
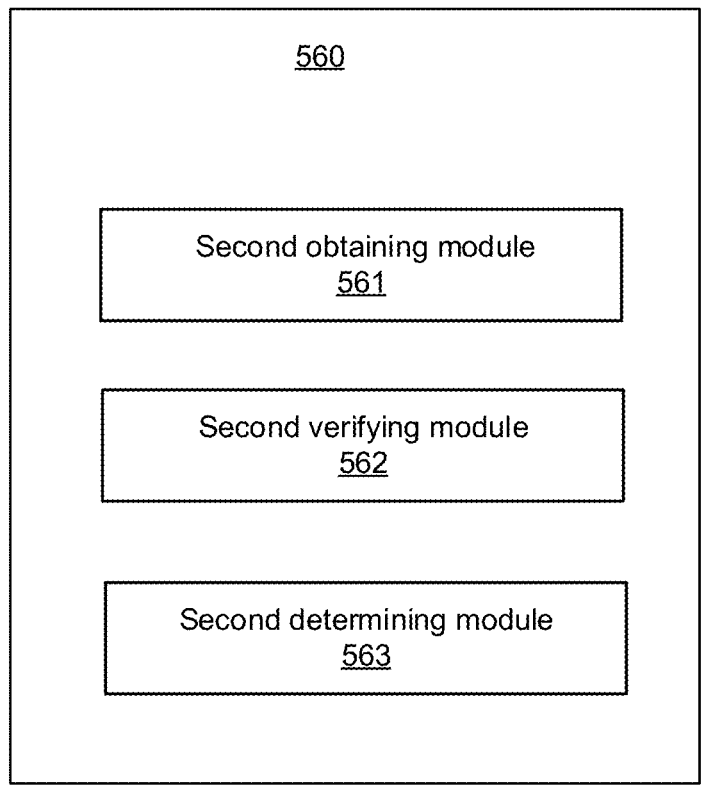
FIG. 6 illustrates a block diagram of an exemplary computer system for detecting replay attack, in accordance with various embodiments.

FIG. 6 illustrates a block diagram of an exemplary computer system 560 for implementing blockchain contract, in accordance with various embodiments. The system 560 may be an exemplary implementation of node 1, a combination of node A and node 1, node 2, . . . , node i of the system 100 of FIG. 1 or a similar device. The method 450 may be implemented by the computer system 560. The computer system 560 may comprise one or more processors and one or more non-transitory computer-readable storage media (e.g., one or more memories) coupled to the one or more processors and configured with instructions executable by the one or more processors to cause the system or device (e.g., the processor) to perform the method 450. The computer system 560 may comprise various units/modules corresponding to the instructions (e.g., software instructions). In some embodiments, the computer system 560 may comprise a second obtaining module 561 configured to obtain at least one candidate transaction for adding to a blockchain; a second verifying module 562 configured to verify if an identification of the candidate transaction exists in an identification database, the identification database comprising a plurality of identifications within a validation range; and a second determining module 563 configured to, in response to determining that the identification does not exist in the identification database, determine that the candidate transaction is not associated with a replay attack.

Figure 7:
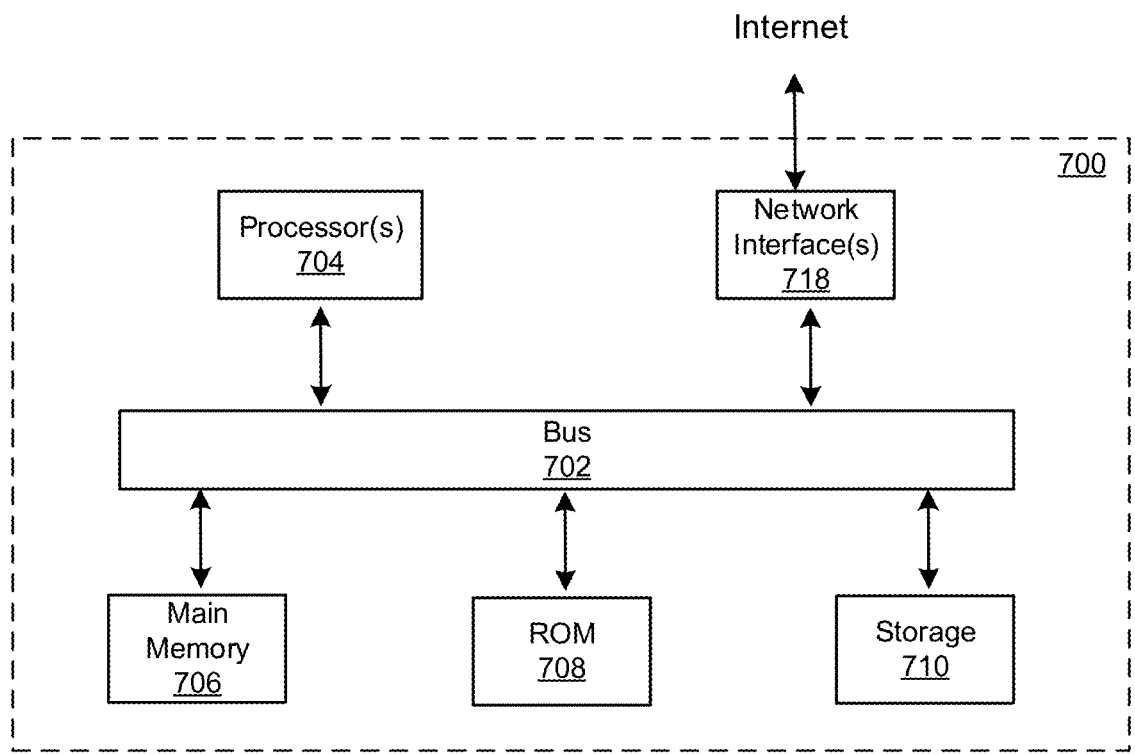
FIG. 7 illustrates a block diagram of an exemplary computer system in which any of the embodiments described herein may be implemented.

FIG. 7 is a block diagram that illustrates a computer system 700 upon which any of the embodiments described herein may be implemented. The system 700 may be implemented in any of the nodes described herein and configured to perform corresponding steps for detecting replay attack. The computer system 700 includes a bus 702 or other communication mechanism for communicating information, one or more hardware processor(s) 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions executable by processor(s) 704. Main memory 706 also may be used for storing temporary variables or other intermediate information during execution of instructions executable by processor(s) 704. Such instructions, when stored in storage media accessible to processor(s) 704, render computer system 700 into a special-purpose machine that is customized to perform the operations specified in the instructions. The computer system 700 further includes a read only memory (ROM) 708 or other static storage device coupled to bus 702 for storing static information and instructions for processor(s) 704. A storage device 710, such as a magnetic disk, optical disk, or USB thumb drive (Flash drive), etc., is provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The main memory 706, the ROM 708, and/or the storage device 710 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

The computer system 700 can send messages and receive data, including program code, through the network(s), network link and network interface 718. In the Internet example, a server might transmit a requested code for an application program through the Internet, the ISP, the local network and the network interface 718.

The received code may be executed by processor(s) 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the this specification. Such embodiments of the subject matter may be referred to herein, individually or collectively, by the term "invention" merely for convenience and without intending to voluntarily limit the scope of this application to any single disclosure or concept if more than one is, in fact, disclosed. The Detailed Description should not to be taken in a limiting sense, and the scope of various embodiments is defined only by the appended claims, along with the full range of equivalents to which such claims are entitled.

The invention claimed is:

1. A computer-implemented method for detecting replay attack without using account nonce, comprising:
   obtaining an identification of a candidate transaction for adding to a blockchain, wherein the identification is based at least on a timestamp and transaction information of the candidate transaction;
   verifying if the timestamp is within a time validation range and if the identification of the candidate transaction exists in an identification database, the identification database comprising a plurality of identifications of candidate transactions with corresponding timestamps within the time validation range; and
   in response to determining that the timestamp is within the time validation range and that the identification does not exist in the identification database, determining that the candidate transaction is not associated with a replay attack.

2. The method of claim 1, wherein:
the identification comprises a hash value of the candidate transaction.

3. The method of claim 2, wherein:
the candidate transaction comprises the timestamp and the transaction information; and
obtaining the identification of the candidate transaction for adding to the blockchain comprises receiving the candidate transaction, and generating the hash value based at least on the timestamp and the transaction information as the identification.

4. The method of claim 2, wherein:
obtaining the identification of the candidate transaction for adding to the blockchain comprises receiving the hash value as the identification; and
the method further comprises: receiving the timestamp and the transaction information, and verifying the identification by verifying the hash value based at least on the timestamp and the transaction information.

5. The method of claim 1, wherein:
the timestamp is configured by a user terminal that initiated the candidate transaction; and
obtaining the identification of the candidate transaction for adding to the blockchain comprises receiving the identification from the user terminal.

6. The method of claim 1, wherein:
the timestamp is configured by a blockchain node; and
obtaining the identification of the candidate transaction for adding to the blockchain comprises:
   receiving, by the blockchain node, an initiated transaction from a user terminal, the initiated transaction comprising the transaction information;
   adding, by the blockchain node, the timestamp to the initiated transaction to obtain the candidate transaction; and
   generating, by the blockchain node, the identification based on the candidate transaction including the transaction information and the added timestamp.

7. The method of claim 1, further comprising:
in response to determining that the timestamp is within the time validation range and the identification does not exist in the identification database, adding the identification to the identification database.

8. The method of claim 1, further comprising:
in response to determining that the timestamp is within the time validation range and the identification does not exist in the identification database, adding the candidate transaction to a cache for storing candidate transactions.

9. The method of claim 1, further comprising:
in response to determining that the timestamp is not within the time validation range, returning an error message to a computing device that submitted the candidate transaction or the identification.

10. The method of claim 1, further comprising:
in response to determining that the identification exists in the identification database, determining that the candidate transaction is associated with the replay attack.

11. The method of claim 1, further comprising:
performing consensus verification on the candidate transaction.

12. The method of claim 11, further comprising:
synchronizing the identification database with one or more other blockchain nodes;
verifying if the timestamp is within the time validation range and if the identification of the candidate transaction exists in the synchronized identification database; and
in response to determining that the timestamp is within the time validation range and the identification does not exist in the identification database, determining that the candidate transaction is not associated with the replay attack; or in response to determining that the identification exists in the synchronized identification database, determining that the candidate transaction is associated with the replay attack.

13. The method of claim 1, before obtaining the identification of the candidate transaction, further comprising:
synchronizing the identification database with one or more other blockchain nodes.

14. The method of claim 1, wherein:
the time validation range corresponds to a time period starting from a time point when a newest block of the blockchain was added to the blockchain.

15. The method of claim 1, wherein:
the time validation range is included in a genesis block of the blockchain.

16. A system for detecting replay attack, comprising one or more processors and one or more non-transitory computer-readable memories coupled to the one or more processors and configured with instructions executable by the one or more processors to cause the system to perform operations comprising:
obtaining an identification of a candidate transaction for adding to a blockchain, wherein the identification is based at least on a timestamp and transaction information of the candidate transaction;
verifying if the timestamp is within a time validation range and if the identification of the candidate transaction exists in an identification database, the identification database comprising a plurality of identifications of candidate transactions with corresponding timestamps within the time validation range; and
in response to determining that the timestamp is within the time validation range and that the identification does not exist in the identification database, determining that the candidate transaction is not associated with a replay attack.

17. The system of claim 16, wherein:
the identification comprises a hash value of the candidate transaction.

18. The system of claim 16, wherein:
the time validation range corresponds to a time period starting from a time point when a newest block of the blockchain was added to the blockchain.

19. A non-transitory computer-readable storage medium configured with instructions executable by one or more processors to cause the one or more processors to perform operations comprising:
obtaining an identification of a candidate transaction for adding to a blockchain, wherein the identification is based at least on a timestamp and transaction information of the candidate transaction;
verifying if the timestamp is within a time validation range and if the identification of the candidate transaction exists in an identification database, the identification database comprising a plurality of identifications of candidate transactions with corresponding timestamps within the time validation range; and
in response to determining that the timestamp is within the time validation range and that the identification does not exist in the identification database, determining that the candidate transaction is not associated with a replay attack.

20. The storage medium of claim 19, wherein:
the identification comprises a hash value of the candidate transaction.

* * * * *